US011305746B2

(12) United States Patent
Hickey (10) Patent No.: US 11,305,746 B2
(45) Date of Patent: Apr. 19, 2022

(54) SEPARABLE TOW HOOK BRAKE RELEASE SYSTEM

(71) Applicant: Artisan Vehicle Systems, Inc., Camarillo, CA (US)

(72) Inventor: Kyle Hickey, Moorpark, CA (US)

(73) Assignee: ARTISAN VEHICLE SYSTEMS, INC., Camarillo, CA (US)

( * ) Notice: Subject to any disclaimer, the term of this patent is extended or adjusted under 35 U.S.C. 154(b) by 384 days.

(21) Appl. No.: 16/434,405

(22) Filed: Jun. 7, 2019

(65) Prior Publication Data
US 2020/0384969 A1 Dec. 10, 2020

(51) Int. Cl.
| B60T 11/10 | (2006.01) |
| B60T 17/08 | (2006.01) |
| E21C 29/24 | (2006.01) |
| B60L 50/60 | (2019.01) |
| B60T 17/04 | (2006.01) |

(52) U.S. Cl.
CPC ............ *B60T 11/108* (2013.01); *B60L 50/60* (2019.02); *B60T 17/043* (2013.01); *B60T 17/08* (2013.01); *E21C 29/24* (2013.01)

(58) Field of Classification Search
CPC ...... B60T 11/108; B60T 17/043; B60T 17/08; B60T 8/1705; B60T 8/1708; B60L 50/60
USPC ............................................. 303/7; 188/3 H
See application file for complete search history.

(56) References Cited

U.S. PATENT DOCUMENTS

| 2,711,228 A | * | 6/1955 | Shank | ................... | B60T 17/223 |
| | | | | | 303/7 |
| 3,448,834 A | * | 6/1969 | Lammers | .............. | B60T 11/107 |
| | | | | | 188/112 R |
| 5,195,768 A | * | 3/1993 | Hendrix | ................. | B60T 11/107 |
| | | | | | 188/112 R |
| 5,213,396 A | * | 5/1993 | Avery | ........................ | B60T 7/20 |
| | | | | | 188/112 R |
| 5,238,298 A | * | 8/1993 | Wagner | ................... | B60T 13/22 |
| | | | | | 188/170 |
| 5,465,813 A | * | 11/1995 | Lichter | ................. | B60T 17/223 |
| | | | | | 188/112 R |

(Continued)

FOREIGN PATENT DOCUMENTS

EP 3415385 A1 12/2018

OTHER PUBLICATIONS

International Search Report and Written Opinion dated Sep. 11, 2020 for International Patent Application No. PCT/US2020/036111.

*Primary Examiner* — Thomas W Irvin
(74) *Attorney, Agent, or Firm* — Plumsea Law Group, LLC (57) ABSTRACT

A brake release system for a vehicle is described to transfer mechanical movement between two hydraulic actuators. The system includes a first hydraulic system on a removable portion of the vehicle and a second hydraulic system on a main chassis of the vehicle. The two hydraulic systems are mechanically engaged with each other where the removable portion of the vehicle attaches to the main chassis. In this way, a force applied to the removable portion of the vehicle when the vehicle's tow hook is engaged may be transferred to release the parking brake on the main chassis without a hydraulic connection between the removable portion and the main chassis. This may be useful when a removable battery frame with a tow hook makes up a separable rear portion of an electric vehicle, allowing the battery frame to be quickly and efficiently removed from the main chassis of the vehicle.

21 Claims, 8 Drawing Sheets

(56) References Cited

U.S. PATENT DOCUMENTS

| | | | |
|---|---|---|---|
| 6,264,228 B1 * | 7/2001 | Westervelt | B62D 53/06 |
| | | | 188/112 R |
| 8,262,173 B2 * | 9/2012 | Crawford | B60T 7/20 |
| | | | 303/7 |
| 10,206,322 B2 * | 2/2019 | Gerbrandt | B60D 1/145 |
| 10,906,383 B2 * | 2/2021 | Huff | B60K 17/354 |
| 2007/0257551 A1 | 11/2007 | Crawford | |
| 2012/0018235 A1 | 1/2012 | O'Quinn et al. | |
| 2015/0071747 A1 * | 3/2015 | Deahl | B60L 50/64 |
| | | | 414/469 |
| 2018/0029569 A1 | 2/2018 | Schick et al. | |
| 2020/0156500 A1 * | 5/2020 | Huff | B60K 1/04 |
| 2020/0157769 A1 * | 5/2020 | Huff | E02F 9/0858 |

* cited by examiner

SEPARABLE TOW HOOK BRAKE RELEASE SYSTEM

CROSS-REFERENCE TO RELATED APPLICATION(S)

This application is related to commonly owned U.S. patent application Ser. No. 16/434,390, entitled "Electric Load-Haul-Dump Mining Machine"; U.S. patent application Ser. No. 16/434,396, entitled "Battery Load Mechanism for Electric LHD Mining Machine"; and U.S. patent application Ser. No. 16/343,400, entitled "Electric Power Distribution System and Method for Electric Mining Machine"; all filed concurrently herewith on Jun. 7, 2019, and each of which is incorporated herein by reference in its entirety.

BACKGROUND OF THE INVENTION

1. Field of the Invention

The present disclosure relates broadly to electric machines and vehicles, and more specifically to electric machines and vehicles used in subsurface mines.

2. Description of Related Art

An overview of a sub-surface mine environment and general description of electric vehicles for mining is described in U.S. Pat. No. 9,994,117, issued on Jun. 12, 2018, titled "System And Method For Providing Power To A Mining Operation," the entire contents of which are hereby incorporated by reference. The present disclosure relates to heavy duty electric powered machines or vehicles that may operate in a continuous work environment such as a sub-surface mine. The battery packs employed in electric mining machines are heavy-duty, high powered battery packs which are comprised of multiple battery modules contained in a pack housing. Each module is comprised of multiple cells. The modules are equipped with an array of operational sensors and are provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of exemplary battery packs and battery management systems and the associated data generation and monitoring can be found in commonly owned U.S. Pat. No. 9,960,396 issued on May 1, 2018, titled "Module Backbone System;" and U.S. Pat. No. 10,063,069 issued on Aug. 28, 2018, titled "Module Maintenance System;" the entire contents of which are hereby incorporated by reference.

Co-pending and commonly owned U.S. application Ser. No. 15/980,314 filed May 15, 2018, titled "Electrically Powered Mining Vehicle;" U.S. application Ser. No. 15/908,794 filed Feb. 28, 2018, titled "Electric Haul Truck;" U.S. application Ser. No. 15/908,799 filed Feb. 28, 2018, titled "Mounting and Dismounting System for a Battery Assembly;" U.S. application Ser. No. 15/908,802 filed Feb. 28, 2018, titled "Method and System for Mounting and Dismounting Batteries in a Vehicle;" and U.S. application Ser. No. 15/908,804 filed Feb. 28, 2018, titled "Alignment and Locking Mechanism for Removable Battery Assembly" contain descriptions electric mining machines, the batteries, and the sub-surface mining environment, the entire contents of which are hereby incorporated by reference.

3. Background

Generally, a wide variety of known industrial vehicles include a tow hook assembly to enable easy towing of the vehicle when it becomes disabled. Such tow hook assemblies generally include a force-bearing tow hook to which the towing vehicle may attach, and a hydraulic brake release mechanism that triggers release of the parking brake on the disabled vehicle. Release of the parking brake is usually necessary to tow the industrial vehicle, as otherwise the wheels would remain locked and the disabled vehicle would drag. Oftentimes, the size and weight of the disabled industrial vehicle prevents the use of other mechanisms for working around an engaged parking brake—such as by loading the vehicle onto a flatbed, as may be done with common passenger vehicles.

Known towing brake release mechanisms therefore include a hydraulic actuator that is engaged when the tow hook is attached to a towing vehicle. The actuator is then hydraulically connected to a brake release mechanism, such that the hydraulic pressure actuates a brake piston to release the parking brake. In this way, a single hydraulic line generally connects an actuator at one end (at the tow hook) with the brake release mechanism usually located adjacent to the rear wheel axle.

However, such known towing brake release mechanisms may not be suitable for certain types of industrial vehicles. In particular, vehicles where a rear portion of the vehicle (that includes the tow hook) is separable from the rest of the vehicle may be unable to use such a hydraulic system. Namely, removing such a separable rear portion of the vehicle from the rest of the vehicle would require attaching and detaching a hydraulic liquid connection between the two sections of the vehicle. This would be a time-intensive and mechanically complex procedure, in view of the pressures and mechanical configurations used in hydraulic systems.

Accordingly, the problem of releasing a parking brake when a certain configuration of industrial vehicle needs to be towed remains.

Thus there is a need in the art for a separable vehicle tow hook brake release system that address these shortcoming in the art.

SUMMARY OF THE INVENTION

In one aspect, this disclosure provides a vehicle, comprising: a detachable portion including a tow hook and a first hydraulic system; a main body portion including a brake release mechanism and a second hydraulic system connected to the brake release mechanism; wherein the detachable portion is separable from the main body portion of the vehicle by mechanically disengaging a mounting and dismounting system; wherein the first hydraulic system and the second hydraulic system are mechanically connected to each other; and wherein actuation of the first hydraulic system mechanically causes actuation of the second hydraulic system, and actuation of the second hydraulic system causes the break release mechanism to release brakes on the vehicle.

In another aspect, this disclosure also provides an electric mining vehicle, comprising: a removable battery frame, the removable battery frame including a tow hook, a tow hook cylinder, and a transfer cylinder, the transfer cylinder being hydraulically connected to the tow hook cylinder; and a main body portion of the electric mining vehicle; wherein the main body portion of the electric mining vehicle includes a receiver cylinder hydraulically connected to a brake release mechanism; wherein the receiver cylinder is located on the main body portion of the electric mining vehicle in such a way as to be aligned with the transfer cylinder on the removable battery frame; and wherein the removable battery frame is separable from the main body portion of the electric mining vehicle by disengaging a mechanical mounting and dismounting system.

In a third aspect, this disclosure provides an electric mining vehicle, comprising a removable battery frame, the removable battery frame including a tow hook, a tow hook cylinder, and a transfer cylinder, the transfer cylinder being hydraulically connected to the tow hook cylinder; the transfer cylinder being located on a front side of the removable battery frame, and the tow hook and tow hook cylinder both being located on a rear side of the removable battery frame, opposite the front side of the removable battery frame; and a main body portion of the electric mining vehicle; wherein: (1) the removable battery frame reversibly attaches to a rear area of the main body portion; (2) the main body portion of the electric mining vehicle includes a receiver cylinder hydraulically connected to a brake release mechanism, the receiver cylinder being located on the rear area of the main body portion; (3) the tow hook cylinder is located on the removable battery frame such that the tow hook cylinder is mechanically actuated when a towing vehicle attaches to the tow hook; (4) the tow hook cylinder is configured to hydraulically actuate the transfer cylinder when the tow hook cylinder is actuated; (5) the receiver cylinder on the main body portion is aligned with the transfer cylinder on the removable battery frame, such that the transfer cylinder is configured to mechanically actuate the receiver cylinder when the transfer cylinder is actuated; and (6) the receiver cylinder is configured to hydraulically actuate the brake release mechanism when the receiver cylinder is actuated.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems and related apparatuses to release a parking brake on an industrial vehicle are broadly disclosed. These systems enable a removable portion of an industrial vehicle to transfer a force, applied when a tow hook is engaged, across a mechanical connection. By using the mechanical connection, a first hydraulic system may transfer force to a second hydraulic system. The two hydraulic systems may therefore be separable from each other without disconnecting or otherwise interrupting a hydraulic connection, thereby allowing the removable portion of the vehicle to be easily removed from the main body of the vehicle.

A variety of terms are used in this disclosure. These terms are used with reference to the following definitions and descriptions, as well as the knowledge of a person having ordinary skill in the art of industrial vehicles.

Electric mining machines (also referred to herein as electric mining vehicles) are generally powered by onboard battery packs. The machines can be load-haul-dump (LHD) machines, scalers, graders, scoops, rock breakers, cutters, haulers or a combination. In general, electric mining machines are heavy duty vehicles engineered for the challenging subsurface environments and limited spaces powered by an onboard battery or other power source. The machines generally include a tool end, heavy-duty wheels and tires, an operator area, controls, and may include a removable power source mounted onboard the machine.

While this disclosure mainly describes an onboard, removable battery, it will be understood that variations on the energy sources are possible within the scope of this concept. That is the interchangeable energy device may be a battery, a different type of battery, a generator, a fuel engine, or an adaptor for any existing energy infrastructure. It will also be understood that the system may be employed with any combination of devices, such as batteries, adapters and the like. It will also be understood that the energy source is compatible with and in communication with the drive system and drive controller. The energy source, whether battery or trolley adapter, or another type of source would be compatible with the drive system and controller. As described herein, the OCS, overhead catenary system or rail may involve options for off-wire operation such as ground level power supply or on-board energy storage systems. While on-board power generation is a third option that has received less research, this may change with hydrogen fuel cell technology. Any combination of energy systems are also contemplated to within the scope of this disclosure. Ground level power supply can be contact or contactless. Contact ground level power supply essentially employs an embedded third rail as is typically used in subway systems and was used on some early streetcar systems. Much improved versions of this technology may offer advantages in challenging environments that have heavy loads from heating or cooling needs or the need to traverse steep inclines, all of which can quickly drain a stored power system.

Another type of infrastructure which may pre-exist is contactless ground level power supply using induction coils to power the vehicle. Typically this power transfer takes place only when the vehicle is directly above the coils, and the range of such a system may be extended by combining it with an on-board power storage, so that the coils do not need to be present along the entire length of the system. On-board energy storage offers an alternative or complement to ground level power supply. Storage mechanisms include batteries, capacitors, flywheels and in some cases, reclaiming kinetic energy from braking to increase system efficiency. A system that runs off wire for a limited segment can often recharge onboard power as runs on a wired segment. Longer spans of off wire operation may require a recharging station approach, which be attained by sufficient dwell time at a stop. For example, in some streetcar systems, a programed dwell time of contact at a station is sufficient to recharge the roof-mounted supercapacitors, charging in a short amount of time that is customary for its duty cycle.

In general, as used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors; "traction motor" refers to a motor of sufficient size and capacity to move a vehicle of sufficient size for the designated operation.

Also, the vehicle interface equipment of the wayside stations may comprise "plug in" modules, e.g., the vehicle plugs into a receptacle of the wayside station, for receiving electrical power from the station; a continuous power interface by which a vehicle can receive off-board power while moving, such as the aforementioned catenary line or third rail; or the like.

Figure 1:
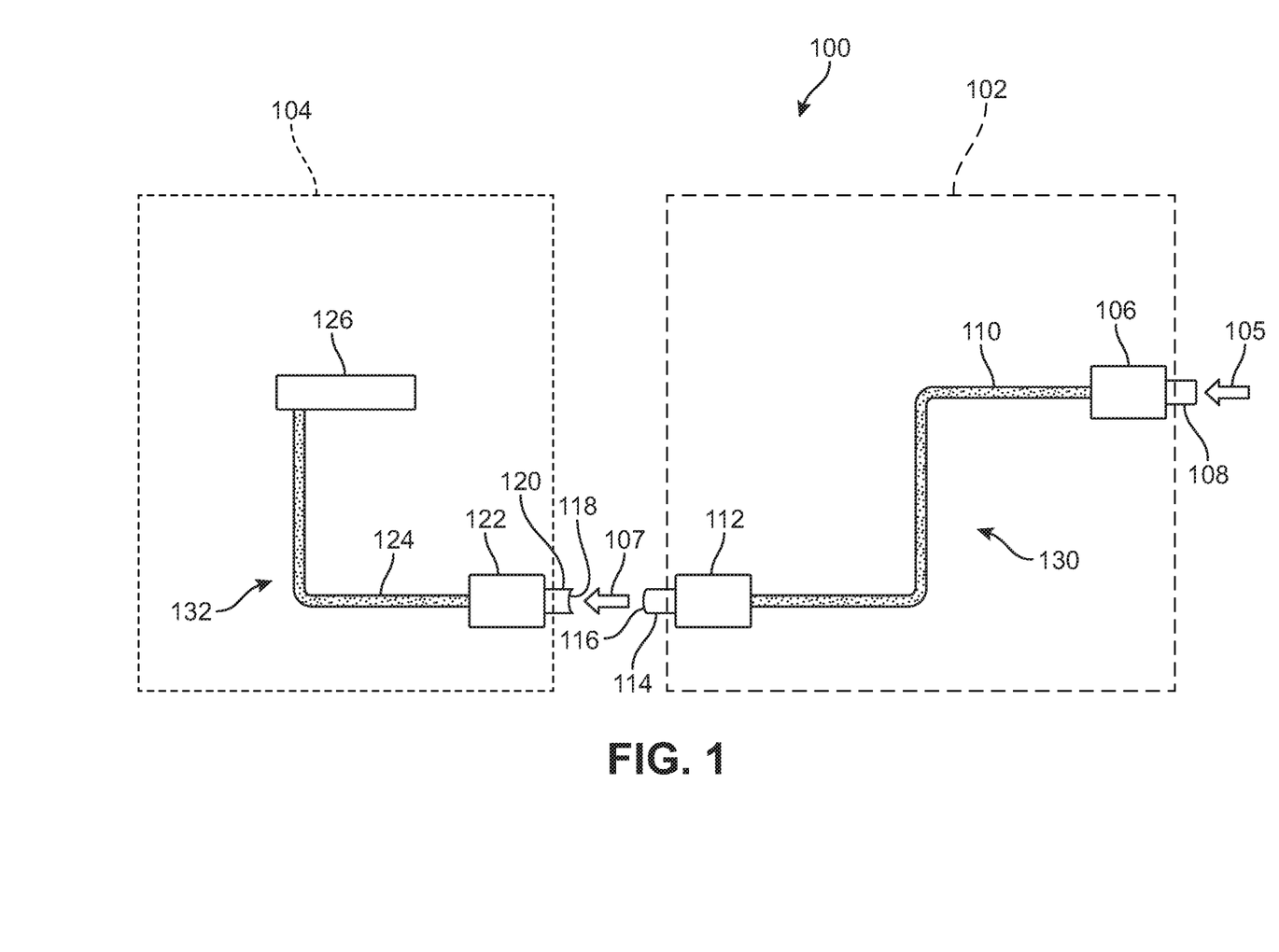
FIG. 1 shows a schematic view of a brake release system that includes two hydraulic systems in mechanical communication with each other.

FIG. 1 shows a schematic diagram of a first embodiment of a brake release system in accordance with this disclosure. In FIG. 1, brake release system 100 is made up of two general sections: first section 102 and second section 104.

First section 102 may include a first hydraulic cylinder 106. As is generally known in the art, a hydraulic cylinder is an actuator that moves along a unidirectional stroke. First hydraulic cylinder 106 includes moveable portion 108. Movable portion 108 is configured to receive a force 105. Specifically, movable portion 108 may be spring biased outward such that it moves inward toward portion 106 when force 105 is applied.

As a hydraulic cylinder, cylinder 106 is configured to transmit force 105 along a hydraulic line 110. Specifically, moveable portion 108 may be connected to a piston inside portion 106 that, when moved, pressurizes a hydraulic fluid within portion 106. The pressurized hydraulic fluid may then be pressurized along hydraulic line 110. Hydraulic line 110 may generally be any known type of hydraulic system used in industrial vehicles, and generally includes a fluid such as an oil. Hydraulic line 110 may be configured within first section 102 in any configuration that allows connections between first hydraulic cylinder 106 and second hydraulic cylinder 112. For example, hydraulic line may traverse first section 102 in any horizontal and/or vertical direction.

Second hydraulic cylinder 112 is in hydraulic fluidic communication with first hydraulic cylinder 106 via hydraulic line 110. As shown in FIG. 1, second hydraulic cylinder 112 may be deposed on a side of first section 112 opposite that of first hydraulic cylinder 106. Second hydraulic cylinder 112 may include movable portion 114. In this instance, moveable portion 114 may be biased inward such that movable portion 114 moves outward away from first section 102 when a hydraulic force is applied to second hydraulic cylinder 112. In this way, inward force 105 applied to first hydraulic cylinder 106 is hydraulically transmitted into an outward force 107 by second hydraulic cylinder 112.

Together, first hydraulic cylinder 106, hydraulic line 110 and second hydraulic cylinder 112 may make up first hydraulic system 130 in first section 102.

Second section 104 then includes a second hydraulic system 132. Specifically, third hydraulic cylinder 122 is located within second section 104 in such a way as to be aligned with second hydraulic cylinder 112 on first section 102. Specifically, when in use, second hydraulic cylinder 112 may be in mechanical contact with third hydraulic cylinder 122. Although shown as being separate from each other in FIG. 1, first section 102 and second section 104 may be adjacent to each other when the brake release system according to the present embodiments is in use in a vehicle.

Third hydraulic cylinder 122 may include movable portion 120. Movable portion 120 may be biased outwards, such that force 107 applied by second hydraulic cylinder 112 would move moveable portion 120 inward. In this way, second hydraulic cylinder 112 and third hydraulic cylinder 122 work together to transmit a force without a hydraulic connection between them. Specifically, second hydraulic cylinder 112 generates outward force 107 that mechanically pushes against moveable portion 120 of third hydraulic cylinder 122, moving it inward.

Furthermore, moveable portion 114 of second hydraulic cylinder 112 may include a first alignment structure 114. Moveable portion 120 of third hydraulic cylinder 120 may similarly include a second alignment structure 118. First alignment structure 114 and second alignment structure 118 may generally be any mechanical structure that ensures that second hydraulic cylinder 112 and third hydraulic cylinder 122 are physically aligned and located in the correct positions relative to each other to ensure that force 107 is properly transferred from second hydraulic cylinder 112 to third hydraulic cylinder 122.

The two hydraulic cylinders (112, 120) are therefore mechanically connected to each other. There is no hydraulic connection between second hydraulic cylinder 112 and third hydraulic cylinder 122. Due to this arrangement, first portion 102 and second portion 104 may be detached from each other without interrupting a hydraulic line or other part of a hydraulic system.

Third hydraulic cylinder 122 is then connected to hydraulic line 124. Specifically, when moveable portion 120 of third hydraulic cylinder 122 is depressed by force 107, the hydraulic fluid in third hydraulic cylinder 122 increases in pressure, and, correspondingly, so does the hydraulic fluid in hydraulic line 124. This increase in pressure transmits a hydraulic force to brake release mechanism 126. In response to receiving this hydraulic force from hydraulic line 124, brake release mechanism 126 may release a parking brake on a vehicle.

Thus, brake release system 100 accepts a mechanical force 105 applied to first hydraulic cylinder 106, then hydraulic cylinder generates a hydraulic force that is transmitted within first section 102 to second hydraulic cylinder 112, then second hydraulic cylinder 112 generates a mechanical force 107 that is applied to third hydraulic cylinder 122, which in turn generates a hydraulic force that is transmitted to brake release mechanism 126. In total, the brake release system 100 therefore translates applied force 105 into brake release mechanism 126 to release a parking brake in a stationary vehicle.

As described above, one or more of hydraulic cylinders may include springs or other mechanisms used to bias the cylinders so that they may return to their pre-actuation or initial state. For example, as shown in FIG. 1, at least first hydraulic cylinder 106 and third hydraulic cylinder 122 include a spring or other bias mechanism configured to return movable portion 108 (in the case of first hydraulic cylinder 106) and moveable portion 120 (in the case of third hydraulic cylinder 122) to their pre-actuation initial state once the applied force is removed. With this arrangement, the brake release system described may operate in reverse order to re-engage the brakes when the applied force is removed.

Figure 2:
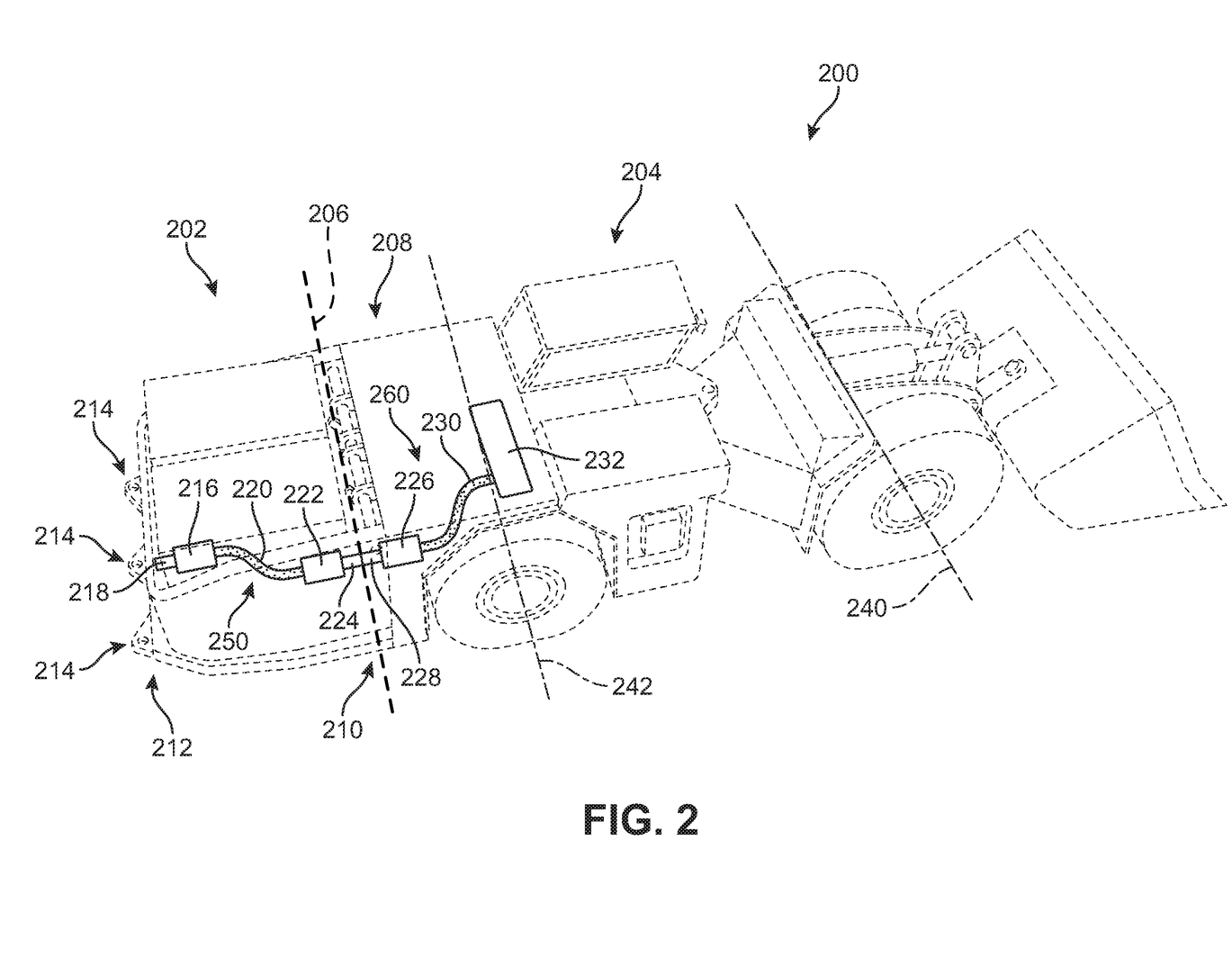
FIG. 2 shows an isometric view of an electric mining vehicle including the brake release system.

FIG. 2 shows one embodiment of a vehicle 200 that includes a brake release system in accordance with this disclosure. As shown in FIG. 2, vehicle 200 is an electric mining vehicle. In one embodiment vehicle 200 is a load-haul-dump (LHD) machine with a hauling capacity of approximately 10 metric tons. In other embodiments, however, the techniques of the present embodiments for a brake release system may be applied to various brake release systems used in a wide variety of types of vehicles, including any type of electric mining machines or vehicles, industrial vehicles, or any other vehicles.

Vehicle 200 includes removable battery frame 202 and main body portion 204. Removable battery frame 202 may be one embodiment of first portion 102, as discussed above and shown in FIG. 1. Main body portion 204 may be one embodiment of second portion 104, as discussed above and shown in FIG. 1. Main body portion 204 may also be referred to as "the body" or "the chassis" of vehicle 200. Line 206 shows where removable battery frame 202 may be removed from main body portion 204.

Generally, removable battery frame 202 is located at a rear of vehicle 200 behind first axle 240 and second axle 242. Removable battery frame 202 attaches to main body portion 204 at a rear side 208 of main body portion 204. Removable battery frame 202 then includes front side 210 that is adjacent to rear side 208 when removable battery frame 202 is attached to main body portion 204. Removable battery frame 202 also includes rear side 212 opposite its front side 210.

In this embodiment, rear side 212 of removable battery frame 202 includes tow hook 214. In the embodiment shown in FIG. 2, vehicle 200 includes multiple tow hooks 214 disposed on rear side 212 of removable battery frame 202. As is generally known in the art of industrial vehicles, a tow hook is a static attachment mechanism onto which a towing vehicle can attach itself for the purpose of towing the subject vehicle when it becomes disabled. In the particular embodiment of electric mining vehicles, tow hooks 214 may be used when vehicle 200 becomes trapped under accumulating rock and other debris in a mine. Mining presents a variety of spatial and safety concerns that must be taken into account when towing a vehicle, and therefore vehicle 200 includes multiple tow hooks 214 that are readily accessible on rear side 212 of removable battery frame 202.

Also included in removable battery frame 202 is first hydraulic system 250. First hydraulic system 250 may be an embodiment of first hydraulic system 130 discussed above with respect to FIG. 1. First hydraulic system 250 includes tow hook cylinder 216 that is located adjacent to one of the plurality of tow hooks 214 on rear side 212. Tow hook cylinder 216 includes movable portion 218 that may extend outward from removable battery frame 202 toward rear side 212. Tow hook cylinder 216 may be actuated when a towing vehicle attaches to tow hook 214 for towing vehicle 200.

Tow hook cylinder 216 is hydraulically connected to hydraulic line 220. As shown in FIG. 2, hydraulic line 220 may wind through removable battery frame 202 in both vertical and horizontal directions as necessary to connect tow hook cylinder 216 with transfer cylinder 222. Transfer cylinder 222 is located on front side 210 of removable battery frame 202, and transfers the hydraulic force received via hydraulic line 220 into a mechanical force that is applied across a separation or gap at line 206 to receiver cylinder 226. In some embodiments, as shown in FIG. 2, movable portion 224 of transfer cylinder 222 may be contiguous with movable portion 228 of receiver cylinder 226. However, in other embodiments, a small gap between the two may remain, for example, as long as the small gap is less than the distance moveable portion 224 of transfer cylinder 222 will move when it is actuated.

Receiver cylinder 226 is located on rear side 208 of main body portion 204 of electric mining vehicle 200. Receiver cylinder 226 receives a mechanical force applied onto it by movable portion 224 of transfer cylinder 222. Specifically, movable portion 228 of receiver cylinder 226 may be pushed inward toward main body portion 204 and away from rear side 208.

As a result of receiving the force, receiver cylinder 226 increases pressure inside hydraulic line 230. Hydraulic line 230 is then in fluidic communication with brake release mechanism 232. As is known in the art of industrial vehicles, brake release mechanism 232 may be located near or adjacent to rear axle 242 so as to release a parking brake similarly located that would otherwise prevent vehicle 200 from being towed.

Collectively, receiver cylinder 226, hydraulic line 230, and brake release mechanism 232 may be referred to as second hydraulic system 260. Thus, main body portion 204 of vehicle 200 includes second hydraulic system 260 in mechanical communication with first hydraulic system 250 in removable battery frame 202. This occurs because transfer cylinder 222 is located on removable battery frame 202 so as to be aligned with receiver cylinder 226 on main body portion 204. In this way, moveable portion 224 may extend outward towards main body portion 204 to actuate moveable portion 228 by compressing it inward.

Therefore, when vehicle 200 may need to be towed, a towing vehicle may first attach to plurality of tow hooks 214 on removable battery frame 202. In so doing, towing vehicle may apply a mechanical force onto moveable portion 218 so as to actuate tow hook cylinder 216. This mechanical force is translated into a hydraulic force by tow hook cylinder 216, which is translated along line 220 to hydraulically actuate transfer cylinder 222. Transfer cylinder 222 then mechanically actuates receiver cylinder 226. Finally, receiver cylinder 226 hydraulically actuates brake release mechanism 232 to release the parking brake so that vehicle 200 may be towed away.

Figure 3:
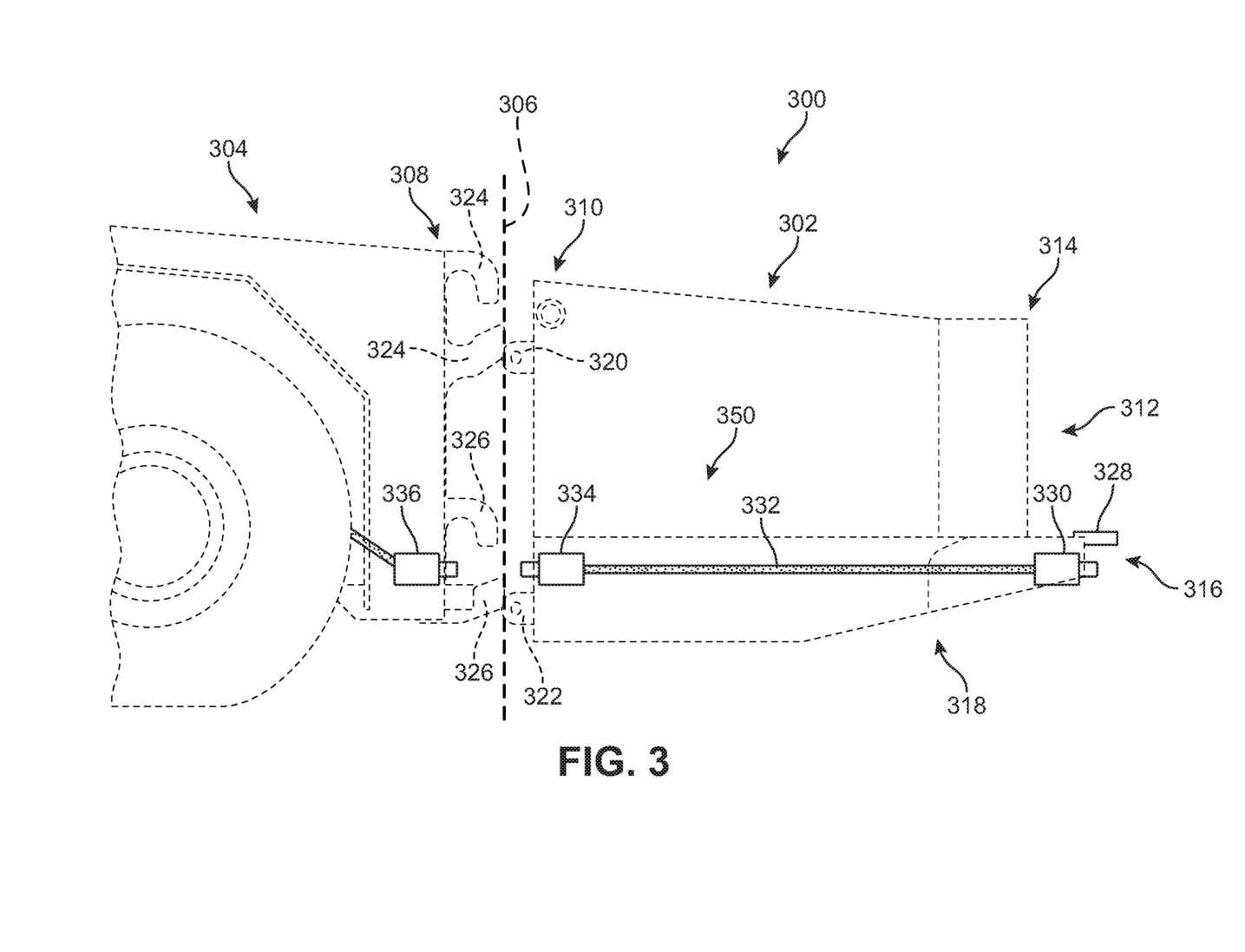
FIG. 3 shows a side view of a battery frame as separated from the main body of an electric mining vehicle that includes the brake release system.

FIG. 3 shows a side view of a removable battery frame 302, as detached from main body portion 304. Vehicle 300 may be substantially similar to vehicle 200 as discussed above. Generally, removable battery frame 302 is completely separable from main body portion 304 as shown by line 306.

FIG. 3 generally shows a mechanical mounting and dismounting system that allows removable battery frame 302 to attach and detach from main body portion 304 of vehicle 300. Broadly, this mounting and dismounting system allows the removable battery frame 302 to be easily and efficiently removed from the rest of vehicle 300 so that removable battery frame 302 may be serviced and/or any battery packs contained in removable battery frame 302 to be charged while separate from vehicle 300. The mounting and dismounting system between removable battery frame 302 and main body portion 304 of vehicle 300 is, therefore, entirely mechanical, in that it does not require interrupting or disconnecting any hydraulic system.

In particular, removable battery frame 302 includes upper retaining element 320 and lower retaining element 322 on front side 310. As shown in FIG. 3, front side 310 is opposite rear side 312, where tow hook 328 is disposed. As shown, upper retaining element 320 is located adjacent to upper area 314 of removable battery frame 302. Lower retaining element 322 is located adjacent to bottom side 318 of removable battery frame 302.

In some embodiments, upper retaining element 320 and lower retaining element 322 may be static structures that do not move relative to the rest of removable battery frame 302. Specifically, upper retaining element 320 and lower retaining element 322 may be solid metal bars oriented horizontally. However, in other embodiments not shown, upper retaining element 320 and lower retaining element 322 may be dynamic structures that move to facilitate a reversible mechanical connection between removable battery frame 302 and main body portion 304.

On the main body portion 304 of vehicle 300, the mounting and dismounting system may include upper hook mechanism 324 and lower hook mechanism 326. Upper hook mechanism 324 and lower hook mechanism 326 may be located on rear side 308 of main body portion 304 of vehicle 300. Upper hook mechanism 324 is configured to engage with upper retaining element 320, and lower hook mechanism 326 is configured to engage with lower retaining element 322. In this way, front side 310 of removable battery frame 302 securely and reversibly mechanically attaches to the rear side 308 of main body portion 304 of vehicle 300.

As further seen in FIG. 3, removable battery frame 302 includes first hydraulic system 350. First hydraulic system 350 is substantially as described above with respect to other figures and other brake release system embodiments. Of particular note in FIG. 3, the location and orientation of tow hook 328 and tow hook cylinder 330 are shown. Specifically, rear side 312 of removable battery frame 302 includes upper area 314 and lower area 316. Lower area 316 is where tow hook 328 and tow hook cylinder 330 are disposed. Generally, a tow hook is most effective when it is below the vehicle's center of gravity. Therefore tow hook 328 is located adjacent to bottom side 318 of removable battery frame 302, in lower area 316 of rear side 312.

Also shown in FIG. 3 is the arrangement of tow hook 328 extending laterally outward from rear side 312 of removable battery frame 302. In this embodiment, tow hook 328 is a static structure to which a towing vehicle may attach a towing mechanism, such as a hook. However, in other embodiments, a tow hook may be a dynamic mechanism that includes, for example, springs, hydraulics, and other components that would transmit a towing force in such a way as may be helpful to towing vehicle 300.

Generally, a towing force will be applied to tow hook 328 in order to move vehicle 300 when it is disabled. As can clearly be seen from FIG. 3, the mounting and dismounting system (320, 322, 324, 326) will therefore also be subject to the towing force. As the removable battery frame 302 makes up a substantial entirety of the rear of vehicle 300, and tow hook 328 is located on removable battery frame 302, removable battery frame 302, therefore, is configured to handle the stress of a towing force applied by the towing vehicle to tow hook 328. Namely, removable battery frame 302 is configured with such a design and made of such materials as to withstand a pulling tow force (and translate that force to main body portion 303) so that vehicle 300 may be towed by rolling on its wheels. As a result, the mounting and dismounting system (320, 322, 324, 326) is able to remain engaged when a lateral towing force is applied to tow hook 328.

Generally, a towing force will exceed the weight of the vehicle being towed. In the case of the example embodiments of electric mining vehicles as shown in FIGS. 2 and 3, the weight of the vehicle may be at least about 10 metric tons, or at least about 20 metric tons, or at least about 30 metric tons, or at least about 40 metric tons, or at least about 50 metric tons. In the case of mining vehicles, a towing force might need to substantially exceed a weight of the mining vehicle when the mining vehicle has become buried in rock or other debris. Accordingly, tow hook 328 and the mounting and dismounting system (320, 322, 324, 326) are configured to withstand towing forces of at least the weights mentioned above. Namely, they should withstand a lateral towing force in these amounts without undergoing a substantial degree of deformation. In some embodiments, tow hook 328 and the mounting and dismounting system (320, 322, 324, 326) may undergo elastic deformation within predetermined safety standards, however, will not undergo plastic deformation.

Figure 6:
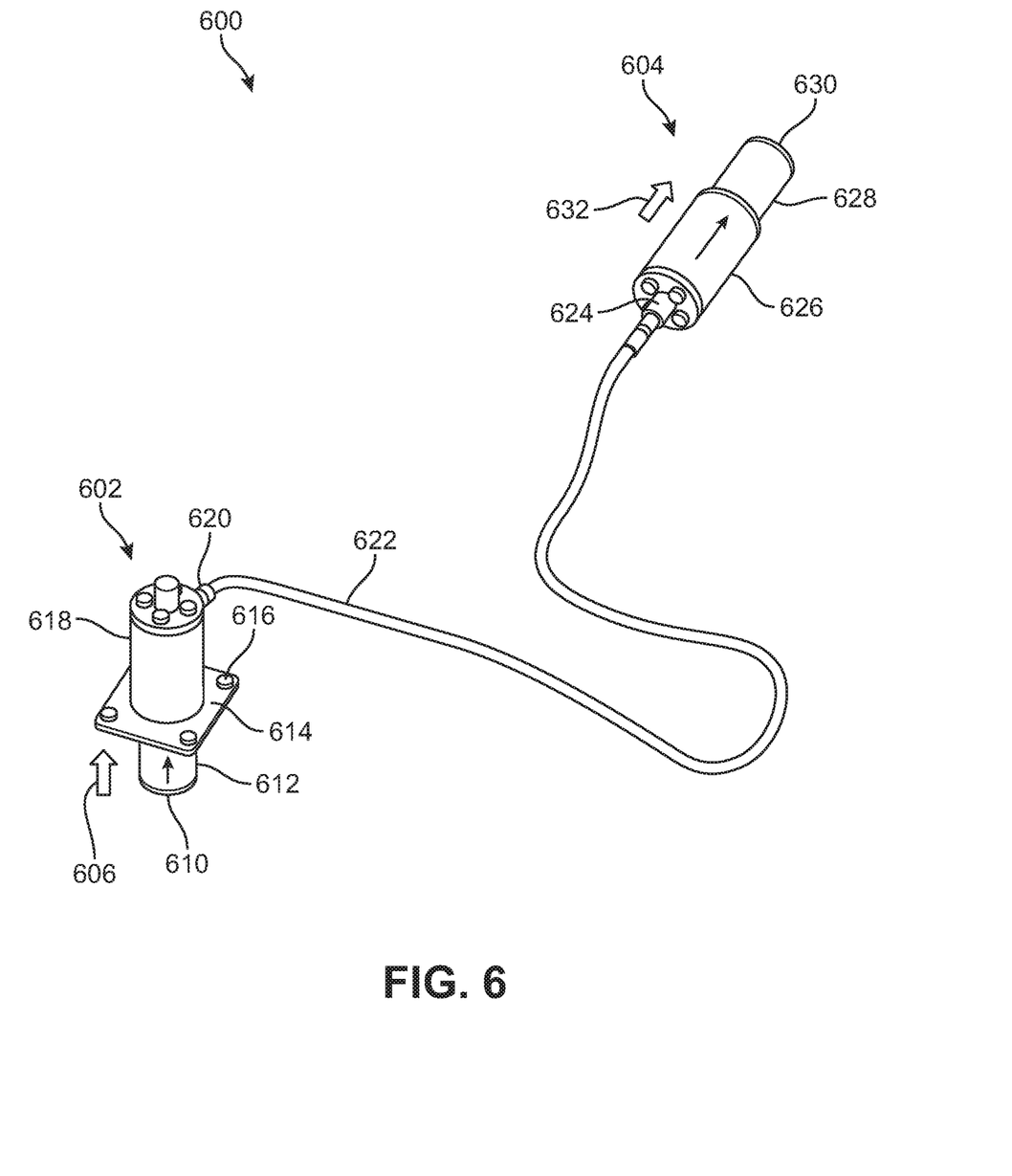
FIG. 6 shows a first hydraulic cylinder hydraulically connected to a second hydraulic cylinder, as used on the removable portion of the brake release system.

As shown in FIG. 3, tow hook cylinder 330 is oriented approximately horizontally with respect to removable battery frame 302. It should be understood, however, that other orientations for tow hook cylinder 330 may be provided. For example, in other embodiments, tow hook cylinder 330 may be oriented approximately vertically with respect to removable battery frame 302 (i.e., rotated 90° in a clockwise direction from the orientation shown in FIG. 3). That is, in other embodiments, tow hook cylinder 330 may be facing towards the ground surface beneath removable battery frame 302, such as is shown in FIG. 6 below.

Figure 4:
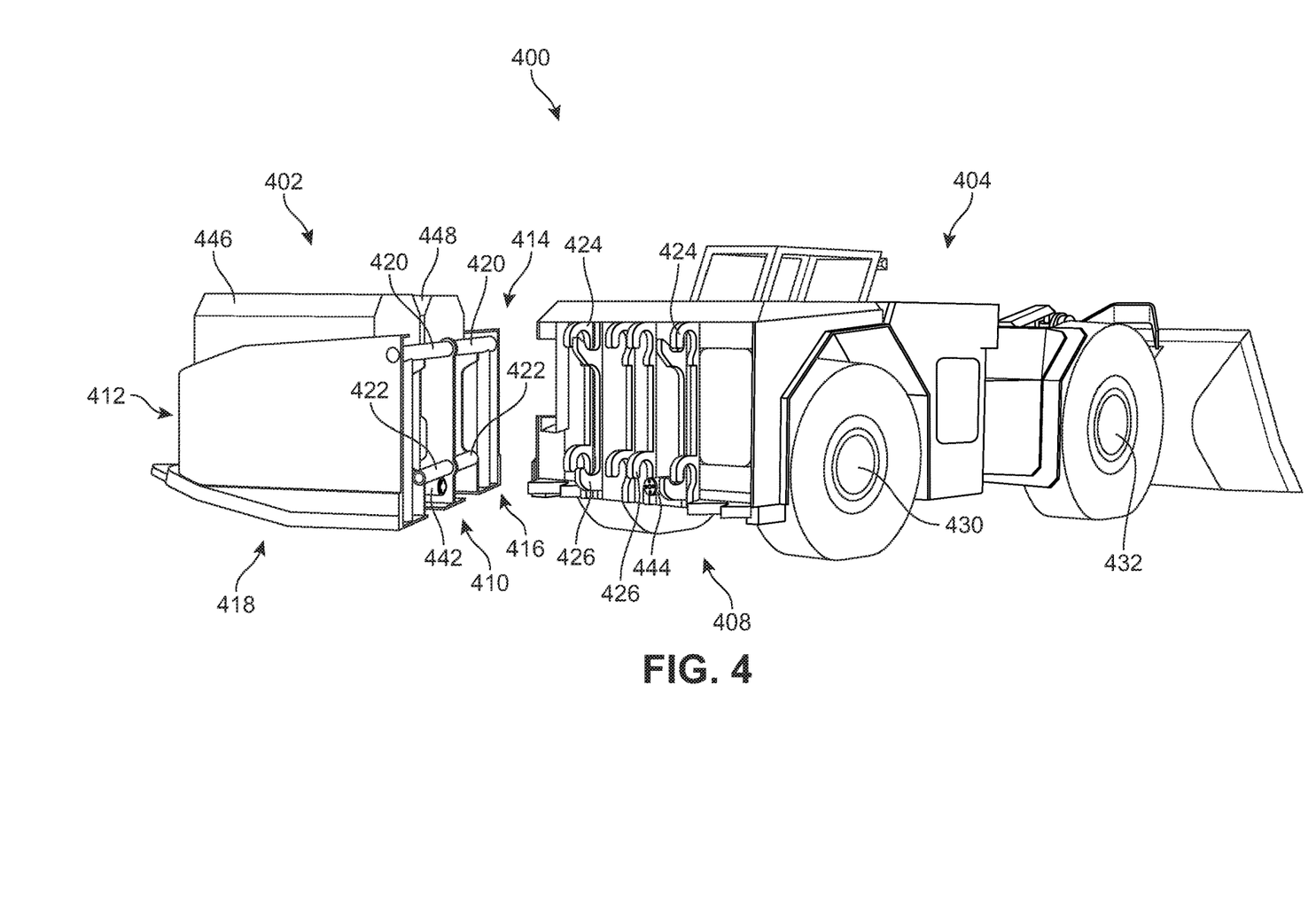
FIG. 4 shows an isometric view of a battery frame and main chassis of an electric mining vehicle as separated from each other, and the hydraulic actuators on each that are part of the brake release system.

FIG. 4 shows an embodiment of an electric mining vehicle 400, and the mechanisms for attaching removable battery frame 402 to main body portion 404, in greater detail.

Specifically, main body portion 404 includes upper hook mechanism 424 and lower hook mechanism 426 on rear side 408 of main body portion 404. Of note, all of the attachment mechanisms are located behind both wheel axles 430, 432. This configuration allows removable battery frame 402 to be removed from main body portion 404 by laterally disengaging the two, without the need for substantial vertical movement which may be constrained in the operating environment of a mine.

Removable battery frame 402 includes tow hook 440 on lower area 416 of rear side 412, adjacent to bottom side 418, as described above. Upper retaining element 420 on removable battery frame 402 is shown in greater detail in FIG. 4. Specifically, upper retaining element 420 and lower retaining element 422 are horizontally orientated bars that extend transversely across rear side 410 of removable battery frame 402. Also shown in FIG. 4 is first battery pack 446 and second battery pack 448. Generally, removable battery frame 402 may include at least one battery pack.

Finally in FIG. 4, also shown are embodiments of transfer cylinder 442 and receiver cylinder 444. These cylinders are shown in greater detail in FIG. 5.

Figure 5:
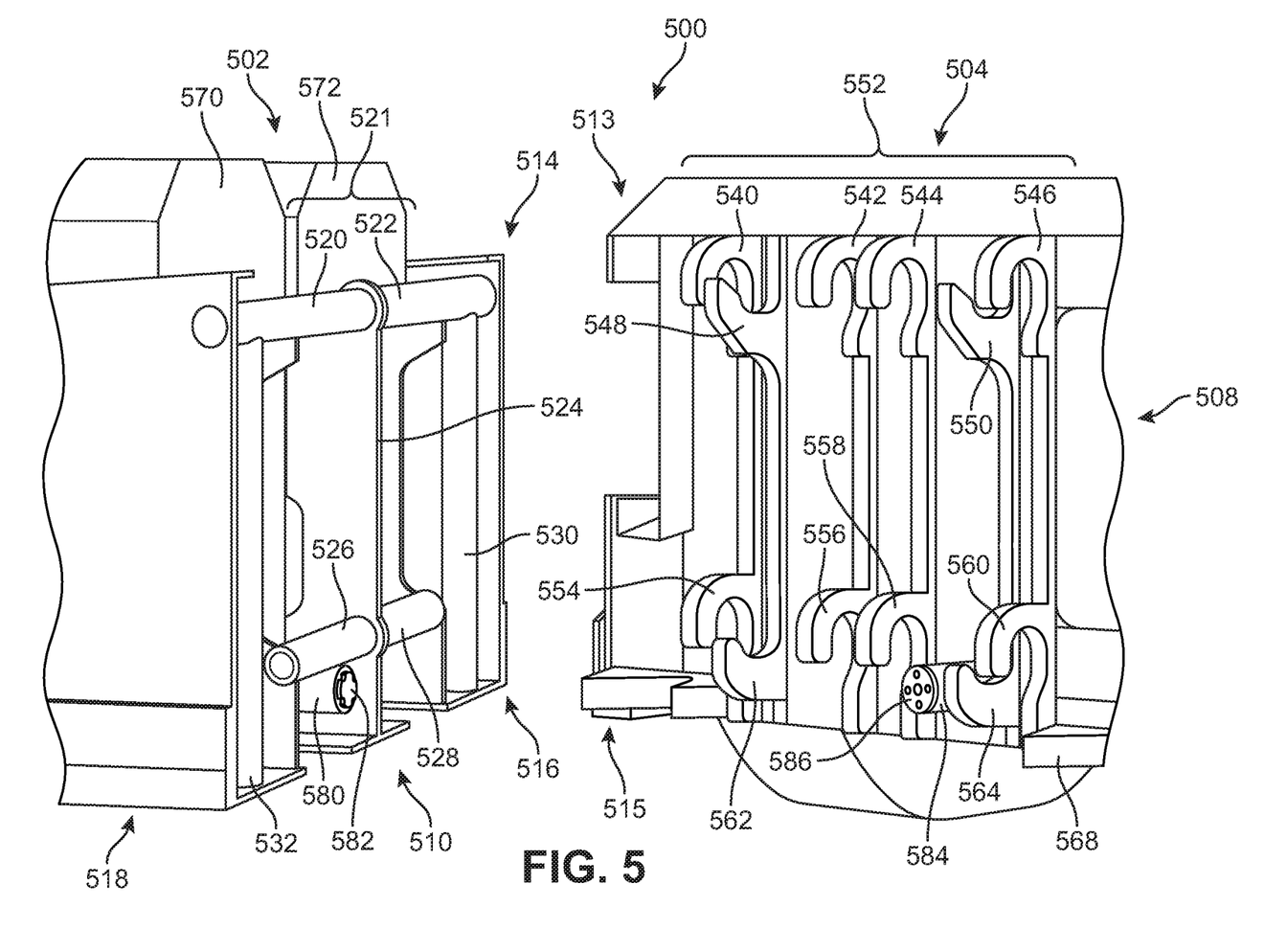
FIG. 5 shows the isometric view of FIG. 4 in greater detail.

FIG. 5 shows an enlarged isometric view of the embodiment from FIG. 4. Namely, in this embodiment, vehicle 500 includes main body portion 504 separated from removable battery frame 502. The details of the mounting and dismounting system that connects the removable battery frame 502 to the main body portion 504 are shown in depth.

Specifically, on the removable battery frame 502 side, first bar 520 and second bar 522 make up an upper retaining element 521 located in upper region 514 of front side 510. First bar 520 and second bar 522 are separated by vertical structure 524. Vertical structure 524 also divides third bar 526 from fourth bar 528 which make up a lower retaining element. Also on rear side 510 are first lateral alignment structure 530 and second lateral alignment structure 532.

These structures on removable battery frame 502 variously engage with the mounting and dismounting structures on rear side 508 of main body portion 504. Specifically, on upper region 512 of rear side 508 of main body portion 504—upper hook mechanism 552 includes first downward hook 540, second downward hook 542, third downward hook 544, fourth downward hook 546, first upward hook 548, and second upward hook 550. First downward hook 540, second downward hook 542, and first upward hook 548 are configured to engage with second bar 522. Third downward hook 544, fourth downward hook 546, and second upward hook 550 are configured to engage with first bar 520.

Similarly, in lower region 515 of rear side 508, lower hook mechanism includes fifth downward hook 554, sixth downward hook 556, seventh downward hook 558, eighth downward hook 560, third upward hook 562, and fourth upward hook 564. Fifth downward hook 554, third upward hook 562, and sixth downward hook 556 are configured to engage with fourth bar 528. Seventh downward hook 558, eighth downward hook 560, and fourth upward hook 564 are configured to engage with third bar 526. Main body 504 also includes third lateral alignment structure 568, configured to engage with second lateral alignment structure 532.

As a result of the above discussed mounting and dismounting system, the removable battery frame 502 is mechanically separable from main body portion 504, but also nonetheless remains securely attached even when subjected to large lateral towing forces.

FIG. 5 also shows first battery pack 570 and second battery pack 572 disposed within removable battery frame 502.

Finally with respect to FIG. 5, also shown is transfer cylinder 580 and receiver cylinder 584. Transfer cylinder 580 may be substantially similar as discussed above with respect to other transfer cylinders, and other second hydraulic cylinders, in a first hydraulic system on removable battery frame 502. Receiver cylinder 584 may also be substantially similar as discussed above with respect to other embodiments of receiver cylinders, and other third hydraulic cylinders, in a second hydraulic system making up a brake release system across removable battery frame 502 and main body portion 504 of vehicle 500.

In this particular embodiment, transfer cylinder 580 includes first alignment surface 582. Similarly, receiver cylinder 584 includes second alignment surface 586. As discussed above, first alignment surface 582 and second alignment surface 586 are configured to ensure that transfer cylinder 580 and receiver cylinder 584 properly align with each other such that a force created by transfer cylinder 580 is directed appropriately into receiver cylinder 584.

Next, FIG. 6 shows an embodiment of a first hydraulic system 600. First hydraulic system 600 may be found on a detachable portion of a vehicle such as a removable battery frame. Generally, first hydraulic system 600 includes first hydraulic cylinder 602 connected to second hydraulic cylinder 604 by hydraulic line 622. First hydraulic cylinder 602 and second hydraulic cylinder 604 are therefore in fluidic communication with each other, such that they hydraulically transfer a force 606.

Namely, force 606 is applied to moveable portion 610 of first hydraulic cylinder 602. As discussed above, force 606 may be applied by a towing vehicle when it attaches to a subject vehicle containing a brake release system in accordance with this disclosure. Moveable portion 610 may extend outward from a detachable portion of a vehicle, by being mounted to the detachable portion with bracket portion 614 and bolts 616. Moveable portion 610 would then be compressed inward into house portion 618 to compress hydraulic fluid therein.

Housing portion 618 is then connected at nozzle 620 to hydraulic line 622. The hydraulic fluid in hydraulic line 622 is also pressurized by the inward movement of moveable portion 610. This pressurization transfers to second hydraulic cylinder 604, and causes moveable portion 628 to extend outward from second housing 626 creating mechanical force 632.

Figure 7:
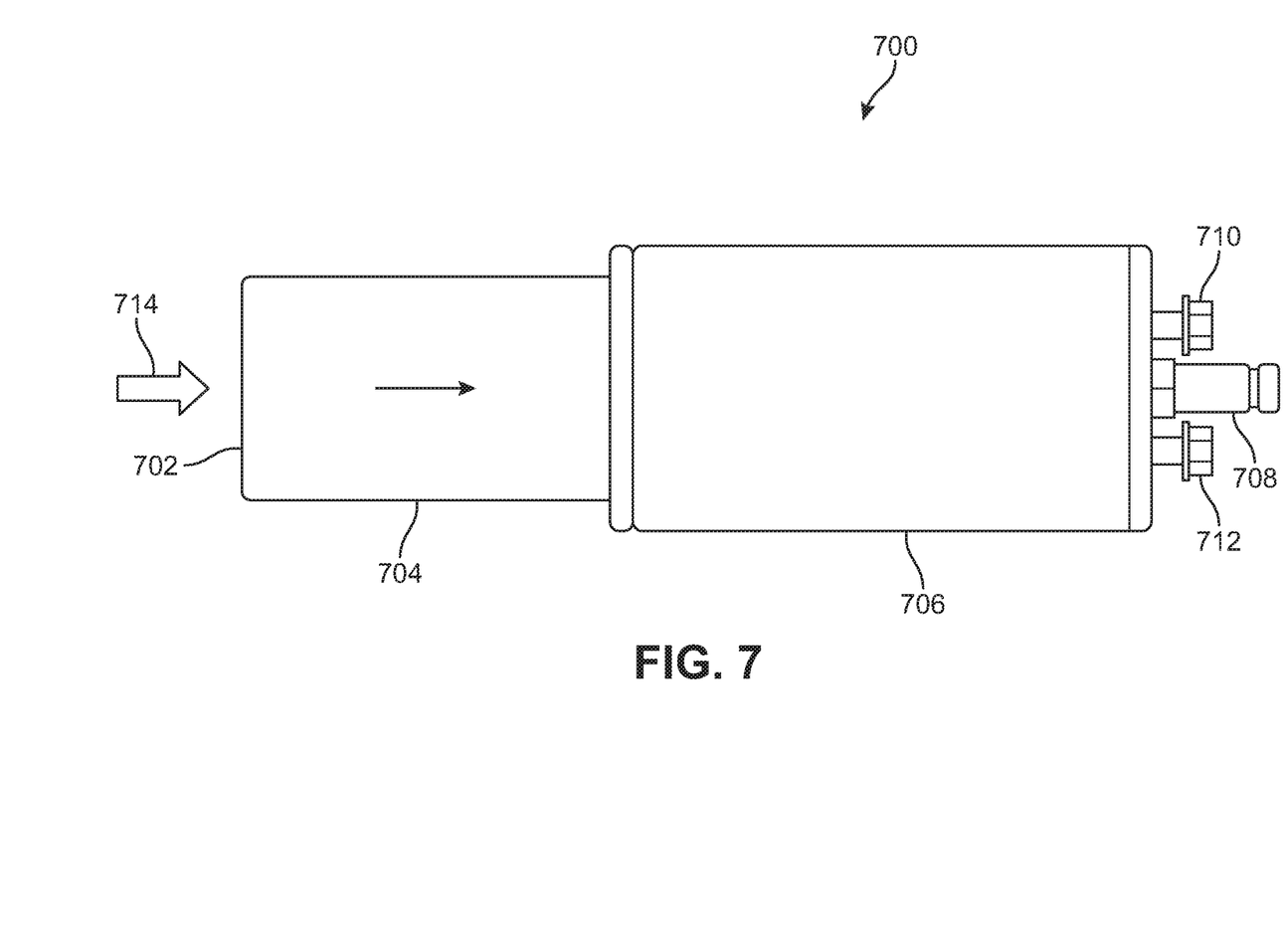
FIG. 7 shows a third hydraulic cylinder, as used on the main chassis portion of the brake release system.

FIG. 7 shows an embodiment of a hydraulic cylinder 700 that can be used as a receiving cylinder on the main body portion of a vehicle containing a brake release system in accordance with this disclosure. Hydraulic cylinder 700 receives force 714 on surface 702 of moveable portion 704. Movable portion 704 is compressed inward by force 714, into housing portion 706. This mechanical force on surface 702 therefore compresses a hydraulic fluid contained in housing portion 706. The pressure is then hydraulically communicated along a hydraulic line (not shown) attached to hydraulic cylinder 700 at nozzle 708. Hydraulic cylinder 700 also includes hydraulic inlet 710 and hydraulic outlet 712, used to remove or add hydraulic fluid as may be necessary to disassemble or otherwise service hydraulic cylinder 700.

Figure 8:
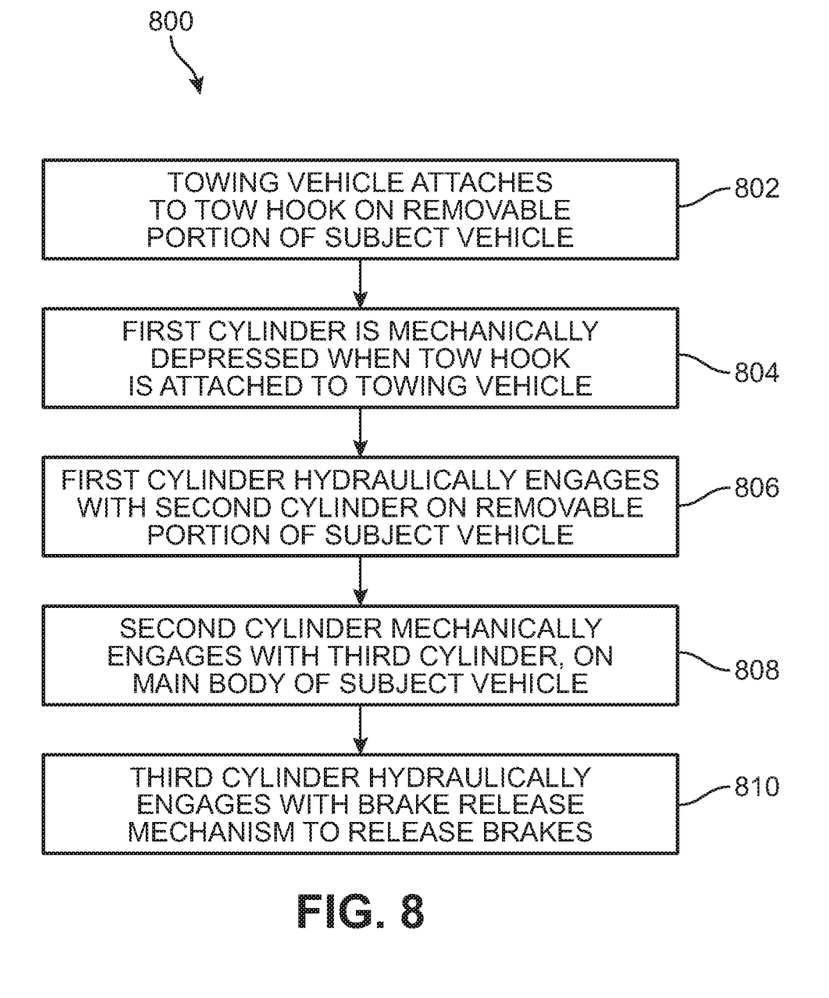
FIG. 8 shows a flowchart of the process steps by which an industrial vehicle including the brake release system of this disclosure is towed.

Finally, FIG. 8 shows a method process of operating a brake release system as discussed above. Methods of operating and using the apparatuses discussed herein above are also within the scope of this disclosure.

Specifically, method 800 includes first step 802 wherein a towing vehicle attaches to a tow hook on a removable portion of a subject vehicle. The subject vehicle includes a brake release mechanism as discussed above. As a result of the attachment of the towing vehicle to the subject vehicle, in step 804 a first hydraulic cylinder is mechanically actuated. The first hydraulic cylinder then hydraulically engages with a second cylinder on the removable portion of the subject vehicle in step 806.

In method step 808, the second hydraulic cylinder then mechanically engages with a third hydraulic cylinder. The third hydraulic cylinder is located on a main body of the subject vehicle. Finally, in step 810 the third cylinder hydraulically engages with a brake release mechanism to release a parking brake on the subject vehicle.

As a result, this process involves a mechanical actuation (802, 804), to a hydraulic actuation (806), to a mechanical actuation (808), and back to a hydraulic actuation (810).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An electric mining vehicle, comprising:
    a removable battery frame, the removable battery frame including
        a tow hook,
        a tow hook cylinder, and
        a transfer cylinder, the transfer cylinder being hydraulically connected to the tow hook cylinder; and
    a main body portion of the electric mining vehicle;
    wherein the main body portion of the electric mining vehicle includes a receiver cylinder hydraulically connected to a brake release mechanism;
    wherein the receiver cylinder is located on the main body portion of the electric mining vehicle in such a way as to be aligned with the transfer cylinder on the removable battery frame; and
    wherein the removable battery frame is separable from the main body portion of the electric mining vehicle by disengaging a mechanical mounting and dismounting system.

2. The electric mining vehicle of claim 1, wherein
    the receiver cylinder is located on a rear area of the main body portion of the electric mining vehicle;
    the removable battery frame mechanically attaches to the rear area of the main body portion;
    the transfer cylinder is located on a front side of the removable battery frame; and
    the tow hook and tow hook cylinder are both located on a rear side of the removable battery frame, opposite the front side of the removable battery frame.

3. The electric mining vehicle of claim 1, wherein
    the tow hook cylinder is located on the removable battery frame such that the tow hook cylinder is mechanically actuated when a towing vehicle attaches to the tow hook.

4. The electric mining vehicle of claim 1, wherein
    the tow hook cylinder is configured to hydraulically actuate the transfer cylinder when the tow hook cylinder is actuated.

5. The electric mining vehicle of claim 1, wherein
    the transfer cylinder is configured to mechanically actuate the receiver cylinder when the transfer cylinder is actuated.

6. The electric mining vehicle of claim 1, wherein
    the receiver cylinder is configured to hydraulically actuate the brake release mechanism when the receiver cylinder is actuated.

7. An electric mining vehicle, comprising
    a removable battery frame, the removable battery frame including:
        a tow hook,
        a tow hook cylinder, and
        a transfer cylinder, the transfer cylinder being hydraulically connected to the tow hook cylinder;
        the transfer cylinder being located on a front side of the removable battery frame, and the tow hook and tow hook cylinder both being located on a rear side of the removable battery frame, opposite the front side of the removable battery frame; and
    a main body portion of the electric mining vehicle;
    wherein:
    the removable battery frame reversibly attaches to a rear area of the main body portion;
    the main body portion of the electric mining vehicle includes a receiver cylinder hydraulically connected to a brake release mechanism, the receiver cylinder being located on the rear area of the main body portion;
    the tow hook cylinder is located on the removable battery frame such that the tow hook cylinder is mechanically actuated when a towing vehicle attaches to the tow hook;
    the tow hook cylinder is configured to hydraulically actuate the transfer cylinder when the tow hook cylinder is actuated;
    the receiver cylinder on the main body portion is aligned with the transfer cylinder on the removable battery frame, such that the transfer cylinder is configured to mechanically actuate the receiver cylinder when the transfer cylinder is actuated; and
    the receiver cylinder is configured to hydraulically actuate the brake release mechanism when the receiver cylinder is actuated.

8. The electric mining vehicle of claim 7, wherein:
    the removable battery frame includes a mounting and dismounting system configured to mechanically attach the removable battery frame to the main body portion of the electric mining vehicle; and
    the mounting and dismounting system is configured to remain engaged with the main body portion when a lateral towing force is applied to the tow hook.

9. The electric mining vehicle of claim 7, wherein:
    the removable battery frame includes an upper retaining element and a lower retaining element,
    the upper retaining element and the lower retaining element being disposed on the rear side of the removable battery frame, opposite the tow hook;
    the rear area of the main body portion of the electric mining vehicle includes a upper hook configured to engage with the upper retaining element, and a lower hook configured to engage with the lower retaining element; and
    wherein the upper retaining element and the upper hook, and the lower retaining element and the lower hook, are configured to remain engaged with each other when a lateral force exceeding the weight of the electric mining vehicle is applied to the tow hook.

10. The electric mining vehicle of claim 7, wherein:
    the tow hook and the tow hook cylinder are located adjacent to a bottom side of the removable battery frame;
    the tow hook extends laterally outward from the rear side of the removable battery frame; and
    the two hook cylinder is located adjacent to the tow hook on the rear side of the removable battery frame.

11. The electric mining vehicle of claim 7, wherein the removable battery frame includes:
    a plurality of tow hooks; and
    at least one battery pack.

12. The electric mining vehicle of claim 7, wherein the brake release mechanism releases a parking brake on the electric mining vehicle when actuated.

13. The electric mining vehicle of claim 7, wherein one end of the transfer cylinder is in direct physical contact with one end of the receiver cylinder when the removable battery frame is attached to the rear area of the main body portion of the electric mining vehicle.

14. A vehicle, comprising:
a detachable portion including a tow hook and a first hydraulic system;
a main body portion including a brake release mechanism and a second hydraulic system connected to the brake release mechanism;
wherein the detachable portion is separable from the main body portion of the vehicle by mechanically disengaging a mounting and dismounting system;
wherein the first hydraulic system and the second hydraulic system are mechanically connected to each other; and
wherein actuation of the first hydraulic system mechanically causes actuation of the second hydraulic system, and actuation of the second hydraulic system causes a break release mechanism to release brakes on the vehicle; and
wherein the vehicle is an electric mining vehicle.

15. The vehicle of claim 14, wherein the first hydraulic system includes a tow hook cylinder located on a lower portion of a rear side of the detachable portion, the tow hook cylinder being configured such that it is mechanically actuated when a towing vehicle connects to the tow hook.

16. The vehicle of claim 14, wherein the detachable portion is located at a rear of the vehicle, behind a first wheel axle and behind a second wheel axle.

17. The vehicle of claim 14, wherein:
first hydraulic system includes a transfer cylinder;
the second hydraulic system includes a release actuator; and
the transfer cylinder and the release actuator are in physical contact with each other when the detachable portion is attached to the main body portion.

18. The vehicle of claim 14, wherein:
the detachable portion includes a first mounting and dismounting system;
the main body portion includes a second mounting and dismounting system;
the first mounting and dismounting system and second mounting and dismounting system being configured to physically interlock with each other, in such a manner that they remain interlocked when a towing force is applied to the tow hook on the detachable portion.

19. The vehicle of claim 14, wherein:
the first hydraulic system includes a tow hook cylinder and a transfer cylinder, the tow hook cylinder and the transfer cylinder being hydraulically connected to each other;
the second hydraulic system includes a release actuator, the release actuator being hydraulically connected to the brake release mechanism;
the transfer cylinder includes a first alignment structure;
the release actuator includes a second alignment structure; and
the first alignment structure and the second alignment structure physically interface with each other, such that a transfer force is applied by the transfer cylinder to the release actuator.

20. A vehicle, comprising:
a detachable portion including a tow hook and a first hydraulic system;
a main body portion including a brake release mechanism and a second hydraulic system connected to the brake release mechanism;
wherein the detachable portion is separable from the main body portion of the vehicle by mechanically disengaging a mounting and dismounting system;
wherein the first hydraulic system and the second hydraulic system are mechanically connected to each other; and
wherein actuation of the first hydraulic system mechanically causes actuation of the second hydraulic system, and actuation of the second hydraulic system causes a break release mechanism to release brakes on the vehicle; and
wherein the first hydraulic system includes a tow hook cylinder located on a lower portion of a rear side of the detachable portion, the tow hook cylinder being configured such that it is mechanically actuated when a towing vehicle connects to the tow hook.

21. A vehicle, comprising:
a detachable portion including a tow hook and a first hydraulic system;
a main body portion including a brake release mechanism and a second hydraulic system connected to the brake release mechanism;
wherein the detachable portion is separable from the main body portion of the vehicle by mechanically disengaging a mounting and dismounting system;
wherein the first hydraulic system and the second hydraulic system are mechanically connected to each other; and
wherein actuation of the first hydraulic system mechanically causes actuation of the second hydraulic system, and actuation of the second hydraulic system causes a break release mechanism to release brakes on the vehicle;
and
the first hydraulic system includes a tow hook cylinder and a transfer cylinder, the tow hook cylinder and the transfer cylinder being hydraulically connected to each other;
the second hydraulic system includes a release actuator, the release actuator being hydraulically connected to the brake release mechanism;
the transfer cylinder includes a first alignment structure;
the release actuator includes a second alignment structure; and
the first alignment structure and the second alignment structure physically interface with each other, such that a transfer force is applied by the transfer cylinder to the release actuator.

\* \* \* \* \*